(12) United States Patent
Beerling

(10) Patent No.: US 7,158,363 B2
(45) Date of Patent: Jan. 2, 2007

(54) LIQUID METAL VARACTOR AND METHOD

(75) Inventor: Timothy Beerling, San Francisco, CA (US)

(73) Assignee: Agilent Technologies, Inc., Santa Clara, CA (US)

(*) Notice: Subject to any disclaimer, the term of this patent is extended or adjusted under 35 U.S.C. 154(b) by 0 days.

(21) Appl. No.: 11/103,095

(22) Filed: Apr. 11, 2005

(65) Prior Publication Data

US 2006/0227494 A1    Oct. 12, 2006

(51) Int. Cl.
*H01G 5/01* (2006.01)
*H01G 7/00* (2006.01)

(52) U.S. Cl. .................................. 361/278; 361/277

(58) Field of Classification Search .............. 361/271, 361/277, 278, 280, 284, 285
See application file for complete search history.

(56) References Cited

U.S. PATENT DOCUMENTS

| | | | |
|---|---|---|---|
| 3,614,630 A * | 10/1971 | Rorden | 455/260 |
| 6,542,350 B1 * | 4/2003 | Rogers | 361/284 |
| 6,559,420 B1 | 5/2003 | Zarev | |
| 6,843,576 B1 * | 1/2005 | Blakley | 359/877 |

* cited by examiner

*Primary Examiner*—Eric W. Thomas

(57) ABSTRACT

A varactor includes a container forming a liquid chamber, a first electrode mounted adjacent the chamber, and a second electrode mounted adjacent the chamber. The chamber may be sized and configured, and a spacing between the electrodes and the chamber may be selected, so that a contact angle of a quantity of liquid metal in the chamber relative to at least one of the electrodes can be changed by applying a bias voltage.

25 Claims, 2 Drawing Sheets

LIQUID METAL VARACTOR AND METHOD

BACKGROUND OF THE INVENTION

A variable capacitor, referred to as a varactor, is one type of circuit element commonly used in RF and microwave circuits. A conventional varactor is a semi-conductor diode that exhibits a change in capacitance in response to a change in applied voltage.

Circuit elements conventionally used in RF and microwave circuits, including varactors, switches, inductors and filters, cannot be integrated into a common assembly with the same fabrication technology, necessitating that discrete circuit elements be mounted on a secondary substrate, e.g. a planar piece of ceramic suitable for high frequency applications. This adds to the cost and size of the RF or microwave circuit, and can impair performance.

SUMMARY OF THE INVENTION

In accordance with the invention a varactor includes a container forming a liquid chamber, a first electrode mounted adjacent the chamber, and a second electrode mounted adjacent the chamber. The chamber may be sized and configured, and a spacing between the electrodes and the chamber may be selected, so that a contact angle of a quantity of liquid metal in the chamber relative to at least one of the electrodes can be changed by applying a bias voltage.

Also in accordance with the invention a method of providing variable capacitance includes the steps of positioning a quantity of liquid metal adjacent a pair of electrodes and applying a bias voltage to the electrodes to cause an amount of overlap of the liquid metal relative to at least one of the electrodes to change.

DETAILED DESCRIPTION

A varactor that employs liquid metal allows it to be integrated into an assembly that also includes an RF switch that also employs liquid metal utilizing the same micromachining fabrication techniques, thereby reducing cost and size, and improving performance. See U.S. Pat. No. 6,559,420 B1 granted May 6, 2003 to Sasko Zarev entitled MICRO-SWITCH HEATER WITH VARYING GAS SUB-CHANNEL CROSS-SECTION, and assigned to Agilent Technologies, Inc., the assignee of the subject application.

Figure 1A:
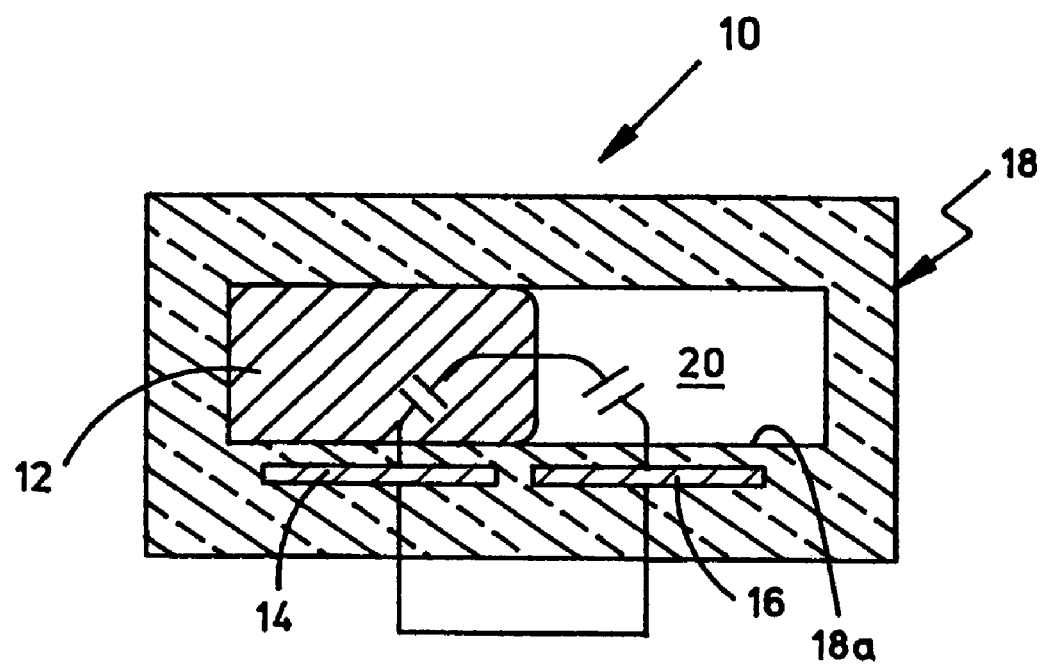
FIGS. 1A and 1B are diagrammatic vertical cross-sectional views illustrating the rest state, and bias state, respectively, of a first embodiment in accordance with the invention.
Figure 1B:
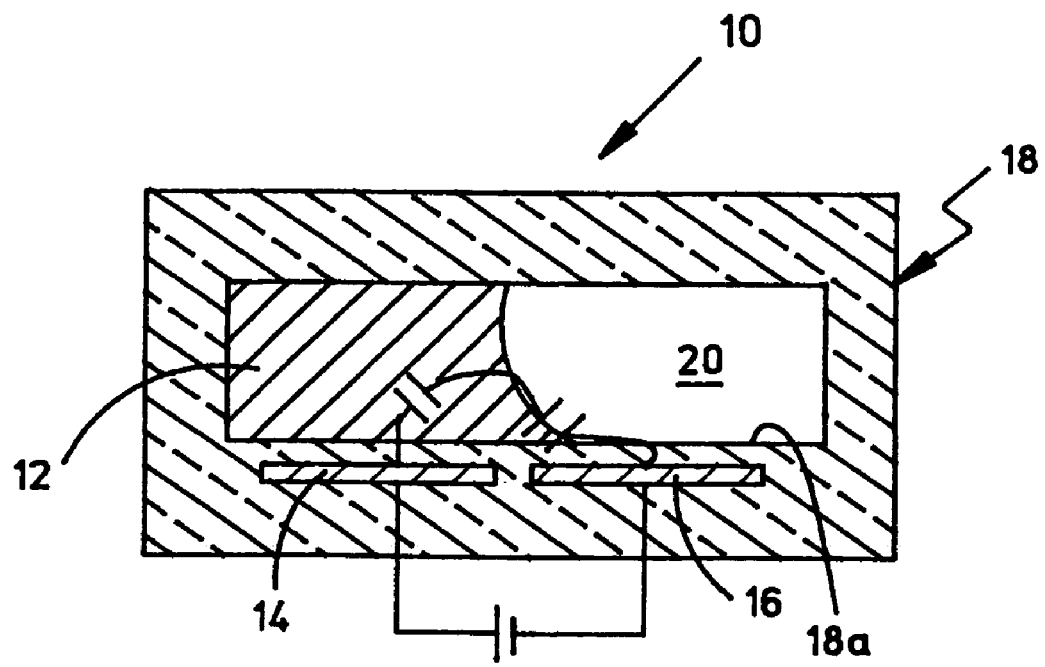

FIGS. 1A and 1B illustrate the rest state, and bias state, respectively, of a first embodiment in accordance with the invention in the form of varactor 10. The capacitance of varactor 10 is varied by reliance upon electro-wetting to change the contact angle of a quantity of liquid metal 12 relative to at least one of a pair of electrodes 14 and 16. The liquid metal 12, such as Mercury or Gallium alloys, partially fills generally rectangular container 18 forming a rectangular liquid chamber 20, although other chamber geometries are possible. Container 18 is made of a dielectric material. Electrodes 14 and 16 are generally planar in configuration. Electrodes 14 and 16 are positioned side-by-side beneath lower wall 18a of container 18. Buried electrodes could also be in the roof of liquid chamber 20 for different geometries. Chamber 20 is sized and configured, and a spacing between electrodes 14 and 16 and chamber 20 is selected, so that a contact angle of liquid metal 12 relative to at least one of the electrodes such as 16 can be changed by applying a DC bias voltage via source (not illustrated) through leads 24 and 26 connected to electrodes 14 and 16, respectively. The polarity of the DC bias voltage is not important to the correct operation of the varactor 10. In the rest state of varactor 10 illustrated in FIG. 1A, liquid metal 12 overlies electrode 14 but not electrode 16. As illustrated in FIG. 1B, when the DC bias voltage is applied to varactor 10, a portion of liquid metal 12 also overlies electrode 16. As illustrated diagrammatically in FIGS. 1A and 1B, the combination of electrodes 14 and 16 and liquid metal 12 effectively forms two capacitors, C1 and C2 connected in series.

The contact angle θ between liquid metal 20 and electrode 16 changes according to Lippmann's equation:

$$\cos \theta(V) = \cos \theta_o + (\epsilon/2\gamma t) V^2 \qquad \text{(Equation No. 1)}$$

where V is the DC bias voltage applied to electrodes 14 and 16 with respect to liquid metal 12, ε is the dielectric constant of the material from which bottom wall 18a of container 18 is made, t is the thickness of bottom wall 18a, γ is the surface tension of liquid metal 12, and $\theta_o$ is the wetting angle with no applied DC bias voltage. As the applied DC bias voltage is increased, the cosine of the contact angle θ increases, which in turn means that the contact angle θ decreases. If the liquid inside container 18 were a poor conductor, there would be a saturation effect, but this effect is not encountered where liquid metal 12 is utilized. By way of example, and not by way of limitation, where bottom wall 18a of container 18 has a thickness of one thousand angstroms with a relative dielectric constant of ten, and liquid metal 12 has an initial wetting angle $\theta_0$ of one hundred and thirty-five degrees (as in the case of Mercury on glass), the contact angle θ will be reduced by about twenty-five degrees with the application of a DC bias voltage of approximately twenty volts. This change in wetting allows the liquid metal to at least partly overlap the electrode 16, with sufficient applied voltage. Those skilled in the art will be familiar with similar movements of aqueous solutions for micro-fluidic applications. This assumes liquid metal 12 is close enough to electrode 16, at rest, to respond to the field, and change the contact angle to increase capacitance.

Referring still to FIGS. 1A and 1b, varactor 10 effectively provides two capacitors C1 and C2 connected in series, where the first one of the capacitors C1 has a constant capacitance value and the second one of the capacitors C2 has a variable capacitance. The total capacitance C of varactor 10 is:

$$C = (C1 \times C2)/(C1+C2) \qquad \text{(Equation No. 2)}$$

The foregoing total effective capacitance equation is valid, no matter the values of C1 and C2. Liquid metal 12 acts as a common electrode for both capacitors C1 and C2. When liquid metal 12 is in its rest state or zero-bias state as illustrated in FIG. 1A, it overlies only electrode 14, and the capacitor C2 is dominated by the air gap between liquid metal 12 and dielectric lower wall 18a. The capacitance of the capacitor C2 is very small and the total capacitance C is then essentially equal to the capacitance of the capacitor C2.

The capacitance of the capacitor C1 is determined by the small gap or spacing provided by dielectric lower wall 18a between liquid metal 12 and electrode 14. The dielectric material can have a high dielectric constant, such as tantalum oxide, for example, to maximize the capacitance.

However, when the DC bias voltage is applied to varactor 10 as illustrated in FIG. 1B, liquid metal 12 will always act to minimize its energy, and it will wet over electrode 16. Electro-wetting causes the surface of the droplet of liquid metal 12 to deform by reduction of the wetting angle $\theta_o$ over electrode 16. As liquid metal 12 now partially overlies electrode 16, the capacitance of the capacitor C2 is now mainly determined by the dimension of the thin dielectric lower wall 18a sandwiched between liquid metal 12 and electrode 16. As the DC bias voltage is increased, the electro-wetting effect increases, and liquid metal 12 will overlap electrode 16 in an ever increasing amount, increasing the capacitance of the capacitor C2. This increases the overall capacitance C of the serial combination of capacitors C1 and C2. As the DC bias voltage is reduced, liquid metal 12 progressively recedes back to its original configuration illustrated in FIG. 1A in which it only overlies electrode 14. This reduces the total capacitance C of varactor 10.

The size and configuration of chamber 20 are selected to ensure that liquid metal 12 returns to its rest state when the DC bias voltage is removed. The chamber 20 must have a size and configuration that ensures that the rest state of the liquid metal is such that it no longer overlaps electrode 16. Liquid metal 12 will not physically respond, i.e. alter its shape, in response to RF or microwave signals because of their high frequency.

Varactor 10 may be fabricated, for example, using thin film deposition techniques and/or thick film screening techniques which could comprise either single layer or multi-layer ceramic substrates or by utilizing well known silicon integrated circuit fabrication methods. Varactor 10 will be understood by those skilled in the art to comprise a substrate and any encapsulating items such as a lid. While only varactor 10 is illustrated in FIGS. 1A and 1B, other circuit elements such as switches, inductors and filters can be simultaneously fabricated along with varactor 10 as part of a common assembly. The part of chamber 20 not filled with liquid metal 12 is preferably filled with an inert gas. Nitrogen, while not an inert gas, may also be used.

In order to minimize the surface oscillations in liquid 12 when actuating varactor 10 to change its total capacitance, the liquid can be made to move into small channels when a bias voltage is applied. Liquid surface oscillations may cause the capacitance to "wiggle", rapidly vary over a predetermined range. A channel supplemented configuration will minimize unwanted capacitive variations. When the liquid metal moves in and out of small channels, the surface oscillations damp out faster. Liquid metal is less likely to want to flow into small channels, when the channel sidewalls are non-wetting. Therefore, the varactor design that employs small channels should strike a balance between damping out surface waves, and maintaining a reasonable voltage bias to move the liquid metal, and thus, change the total capacitance.

Figure 2:
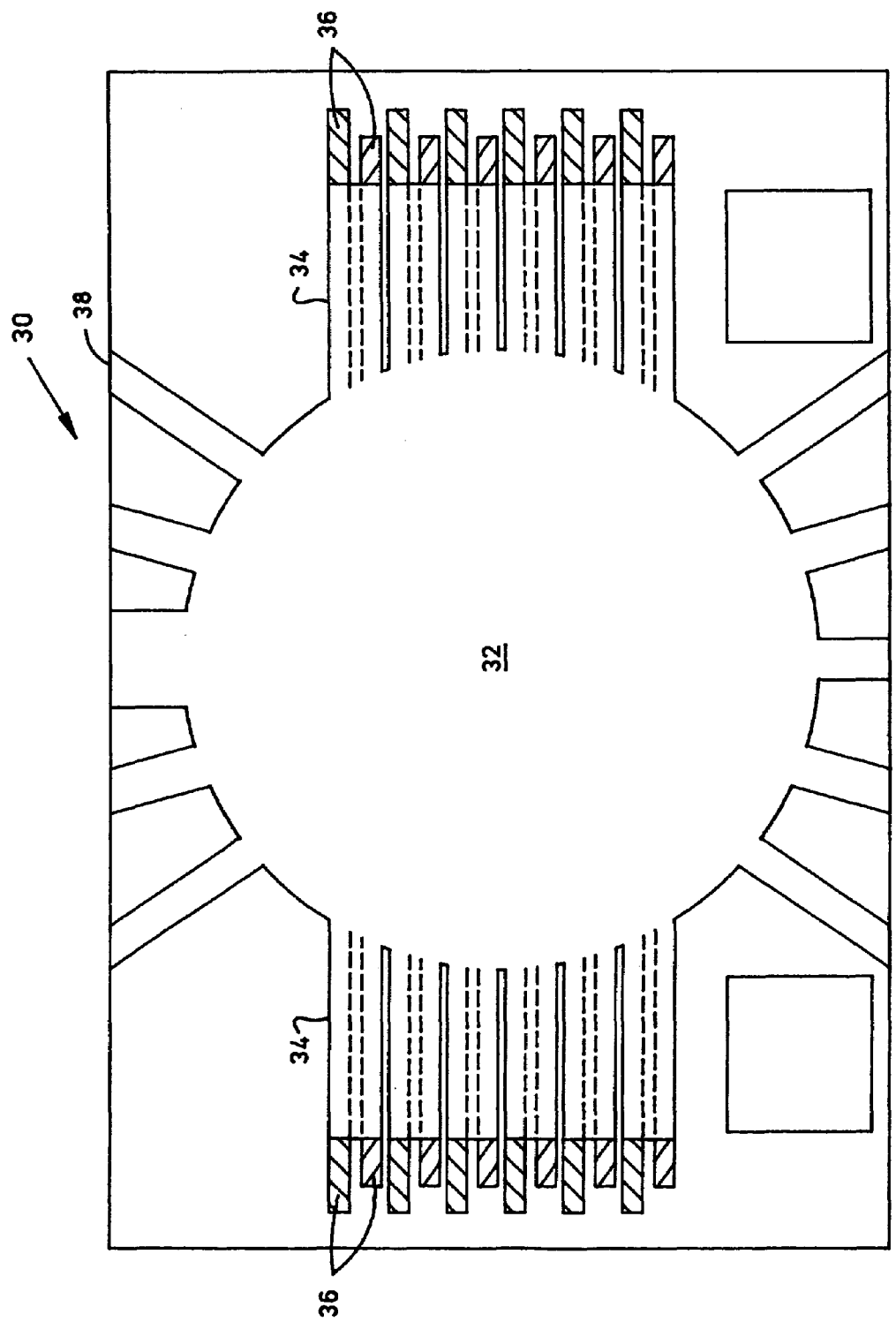
FIG. 2 is a top plan view illustrating a second embodiment in accordance with invention that includes a main liquid chamber and a plurality of liquid channels connected to the main liquid chamber.

FIG. 2 is a top plan view illustrating a second embodiment in accordance with invention in the form of varactor 30. Those skilled in the art of micro-machining will appreciate that FIG. 2 is a two dimensional layout for a photomask that may be used to fabricate varactor 30. The three dimensional layout will be readily apparent. Varactor 30 includes main generally cylindrical liquid chamber 32. A plurality of relatively small liquid channels 34 communicate with main liquid chamber 32. Liquid channels 34 extend in parallel on opposite sides of main liquid channel between parallel electrode pairs 36. A plurality of vent channels 38 communicate with main liquid chamber 32 and extend radially from the sides not having the liquid channels 34. Upon the application of a suitable DC bias voltage to electrode pairs 36 via conductive traces (not illustrated) liquid metal (not illustrated) partially filling main liquid chamber 32 will rapidly move into liquid channels 34, varying the total capacitance across electrode pairs 36. One electrode of each pair 36 extends adjacent a corresponding one of liquid channels 34. Liquid channels 34 are sized, and the spacing between electrodes 36 and liquid channels 34 is selected, so that liquid metal 40 will flow into channels 34 by applying a bias voltage to electrodes 36. The portion of liquid metal 40 overlapping or in close proximity to one of the electrodes 36 of each pair is separated therefrom by a thin dielectric layer and thus the total capacitance of varactor 30 is varied in this fashion. The portions of main liquid chamber 32 and liquid channels 34 not filled with liquid metal 40 may be filled with an inert gas or Nitrogen drawn through vent channels 38.

In accordance with the invention a method of providing variable capacitance includes the steps of positioning a quantity of liquid metal adjacent a pair electrodes and applying a bias voltage to the electrodes to cause an amount of overlap of the liquid metal relative to at least one of the electrodes to change. The liquid metal may provided in a chamber having a dielectric lower wall. The electrodes may be generally planar and spaced from the liquid metal by a thickness of the lower wall of the chamber. The bias voltage may change a contact angle of the liquid metal relative to at least one of the electrodes. Alternatively, the electrodes may extend in parallel from the chamber and the liquid metal may be moved into a liquid channel extending between the electrodes when the bias voltage is applied.

While several embodiments in accordance with the invention have been described, modifications thereof will be obvious to those skilled in the art. Therefore, the protection afforded the invention should only be limited in accordance with the scope of the following claims.

The invention claimed is:

1. A varactor, comprising:
   a container made of a dielectric material forming a liquid chamber;
   a quantity of a liquid metal partially filling the chamber;
   a first electrode mounted adjacent the chamber;
   a second electrode mounted adjacent the chamber; and
   the chamber being sized and configured, and a spacing between the electrodes and the chamber being selected, so that a contact angle of the liquid metal relative to at least one of the electrodes can be changed by applying a bias voltage.

2. The varactor of claim 1 wherein the electrodes are generally planar in configuration.

3. The varactor of claim 2 wherein the electrodes are positioned side-by-side beneath a lower wall of the container.

4. The varactor of claim 3 and further comprising a pair of leads connected to respective ones of the electrodes.

5. The varactor of claim 1 wherein the liquid metal is selected from the group consisting of Mercury and Gallium alloys.

6. The varactor of claim 1 wherein the dielectric material is tantalum oxide.

7. A varactor, comprising:
a container made of a dielectric material forming a liquid chamber;
a quantity of a liquid metal in the chamber;
a first electrode mounted adjacent the chamber;
a second electrode mounted adjacent the chamber; and
wherein the container is configured to provide a main liquid chamber and a plurality of liquid channels that communicate with the main liquid chamber.

8. A varactor, comprising:
a container forming a liquid chamber and having lower wall made of a dielectric material;
a first electrode mounted to the lower wall adjacent the chamber;
a second electrode mounted to the lower wall adjacent the chamber; and
a quantity of a liquid metal partially filling the chamber.

9. The varactor of claim 8 wherein the electrodes are generally planar in configuration.

10. A varactor, comprising:
a container forming a liquid chamber;
a first electrode mounted adjacent the chamber;
a second electrode mounted adjacent the chamber;
a quantity of a liquid metal partially filling the chamber; and
wherein the chamber is sized and configured, and a spacing between the electrodes and the chamber is selected, so that a contact angle of the liquid metal relative to at least one of the electrodes can be changed by applying a bias voltage.

11. A varactor, comprising:
a container forming a liquid chamber;
a first electrode mounted adjacent the chamber;
a second electrode mounted adjacent the chamber;
a quantity of a liquid metal partially filling the chamber; and
wherein the electrodes are positioned side-by-side beneath a lower wall of the container.

12. A varactor, comprising:
a container forming a liquid chamber;
a first electrode mounted adjacent the chamber;
a second electrode mounted adjacent the chamber;
a quantity of a liquid metal partially filling the chamber; and
wherein the container is configured to provide a main liquid chamber and a plurality of liquid channels that communicate with the main liquid chamber.

13. The varactor of claim 12 wherein the main liquid container is generally cylindrical.

14. The varactor of claim 13 wherein the liquid channels extend in parallel from opposite sides of the main liquid container between parallel electrode pairs.

15. The varactor of claim 12 and further comprising a plurality of vent channels communicating with the main liquid chamber.

16. A varactor, comprising:
a container forming a main liquid chamber and a plurality of liquid channels that communicate with the main liquid chamber;
a plurality of electrode pairs, at least one electrode of each pair extending adjacent a corresponding one of the liquid channels;
a quantity of a liquid metal partially filling the main chamber; and
the liquid channels being sized, and a spacing between the electrodes and the liquid channels being selected, so that the liquid metal will flow into the channels by applying a bias voltage to the electrodes.

17. A method of providing variable capacitance, comprising the steps of:
positioning a quantity of a liquid metal in a chamber having a dielectric lower wall and adjacent a pair of electrodes; and
applying a bias voltage to the electrodes to cause an amount of overlap of the liquid metal relative to at least one of the electrodes to change.

18. The method of claim 17 wherein the electrodes are generally planar and are spaced from the liquid metal by a thickness of the lower wall of the chamber.

19. The method of claim 18 wherein the bias voltage changes a contact angle of the liquid metal relative to at least one of the electrodes.

20. The method of claim 17 wherein the electrodes extend in parallel from the chamber and the liquid metal is moved into a liquid channel extending between the electrodes when the bias voltage is applied.

21. A varactor, comprising:
a container made of a dielectric material forming a liquid chamber;
a quantity of a liquid metal partially filling the chamber;
a first electrode mounted adjacent to the chamber and separated from the liquid metal by the dielectric material;
a second electrode mounted adjacent to the chamber and separated from the liquid metal by the dielectric material; and
the chamber being sized and configured, a spacing between the electrodes and the chamber being selected, so that a contact angle of the liquid metal to at least one of the electrodes can be changed by applying a biased voltage.

22. The varactor of claim 21 wherein the electrodes are generally planar in configuration.

23. The varactor of claim 22 wherein the electrodes are positioned side-by-side beneath a lower wall of the container.

24. The varactor of claim 23 and further comprising a pair of leads connected to respective ones of the electrodes.

25. The varactor of claim 21 wherein the liquid metal is selected from the group consisting of Mercury and Galium alloys.

* * * * *

UNITED STATES PATENT AND TRADEMARK OFFICE
CERTIFICATE OF CORRECTION

PATENT NO. : 7,158,363 B2 Page 1 of 1
APPLICATION NO. : 11/103095
DATED : January 2, 2007
INVENTOR(S) : Beerling It is certified that error appears in the above-identified patent and that said Letters Patent is hereby corrected as shown below:

In column 6, line 56, in Claim 25, delete "Galium" and insert -- Gallium --, therefor.

Signed and Sealed this

Fourth Day of September, 2007

JON W. DUDAS
*Director of the United States Patent and Trademark Office*